Aug. 26, 1952 J. E. BARTH 2,608,456

MOVABLE CARRIAGE SYSTEM FOR PHONOGRAPH MECHANISM AND THE LIKE

Filed Nov. 30, 1949 3 Sheets-Sheet 1

INVENTOR
JAY E. BARTH
BY H. W. Newton
ATTORNEY

MOVABLE CARRIAGE SYSTEM FOR PHONOGRAPH MECHANISM AND THE LIKE

Filed Nov. 30, 1949 3 Sheets-Sheet 2

INVENTOR
JAY E. BARTH
BY H. C. Newton
ATTORNEY

Aug. 26, 1952 J. E. BARTH 2,608,456

MOVABLE CARRIAGE SYSTEM FOR PHONOGRAPH MECHANISM AND THE LIKE

Filed Nov. 30, 1949 3 Sheets-Sheet 3

INVENTOR
JAY E. BARTH
BY H. W. Newton
ATTORNEY

Patented Aug. 26, 1952

2,608,456

UNITED STATES PATENT OFFICE 2,608,456

MOVABLE CARRIAGE SYSTEM FOR PHONOGRAPH MECHANISM AND THE LIKE

Jay E. Barth, Pitman, N. J., assignor to Radio Corporation of America, a corporation of Delaware Application November 30, 1949, Serial No. 130,209

6 Claims. (Cl. 312—8)

The present invention relates to phonographs, and record playing mechanisms therefor of the type commonly known as record changers or players. More particularly, the invention relates to a carriage system for supporting and controlling movable record changers or players in cabinets and like housing structures of phonographs and radio-phonograph combination equipment.

In modern radio-phonograph combination apparatus, a record playing mechanism or record changer is mounted in a compartment or space of the cabinet or housing for the apparatus, and is provided with means, such as a carriage, for moving the mechanism or changer to facilitate operation of the record changer. Various carriage systems have been provided heretofore for effecting or permitting movement of record playing mechanisms from a normal record playing or stored position within a suitable space or compartment of a console cabinet, for example, to an external position for loading and unloading records. A record player mechanism and carriage system may be provided as part of the phonograph cabinet structure which includes a hinged or otherwise movable, frontally opening door as a closure means for the compartment. A carriage system of this type to which the invention particularly relates is shown, by way of example, in U. S. Patent 2,295,368 to Suomala.

In the patent referred to, a record playing mechanism is contained in a frontally opening compartment in a console type radio-phonograph combination, and is mounted on a carriage provided with rollers engaging tracks in the bottom of the compartment. Track extensions are provided on the inside face of the door closure means for the compartment, which is hinged along its lower edge to drop forwardly to a horizontal position when the compartment is opened. The tracks on the door and in the compartment are then in alignment and permit the record playing mechanism to roll forwardly with the carriage and outwardly of the compartment, into a position on the door for loading and unloading records. The carriage and door are separately operable. However, the door serves to operate a latch which releases the carriage for forward movement when the door is opened, the carriage otherwise being locked in place within the compartment.

A disadvantage of this type of carriage system comes from the fact that the carriage and record playing mechanism must be moved out of and into the cabinet compartment and the door closing means must be opened and closed as separate manual operations in loading and unloading records.

It is, therefore, a primary object of this invention to provide an improved carriage system for phonograph record playing mechanisms and the like, which provides for movement of the controlled phonograph mechanism either out of or into the cabinet enclosure by a single manual operation and which, at the same time, provides for locking the phonograph unit both in the forward and retracted positions, whereby accidental rolling of the unit out of or into the compartment is prevented.

A further object of the invention is to provide an improved carriage system for effecting movement of a record player or like phonograph apparatus into and out of a cabinet compartment without the use of rollers and guide track means.

A specific object of the invention is to provide an improved cabinet door and record player linkage system for effecting smoothly accelerated and speedy movement of a record player or like phonograph apparatus into and out of a cabinet compartment for which a door is provided as the closure means, and wholly by operation of the door.

Normally, when a retractible or movable record player, after being loaded with records, is returned to the storage or playing space, it may be jarred by the compartment door-closing movement sufficiently to cause the tone arm to jump off its record-engaging position, and may even spill or break some of the records.

It is also an object of the present invention, to provide an improved mechanical linkage or control system for positioning an enclosed record changer or like phonograph apparatus for loading and unloading records wholly by movement of the enclosure door, and without jarring the mechanism or spilling records.

An additional object of the present invention is to provide an improved cabinet door linkage and carriage system which is arranged for holding a retractible phonograph mechanism or the like in a locked position at the ends of its travel, and which permits ready detachment and remounting of the mechanism.

Another object of the present invention is the provision of a smoothly operating, inexpensive door linkage for a retractible record changer or like unit in which the unit is readily detachable for separate use or for maintenance.

Figure 1:
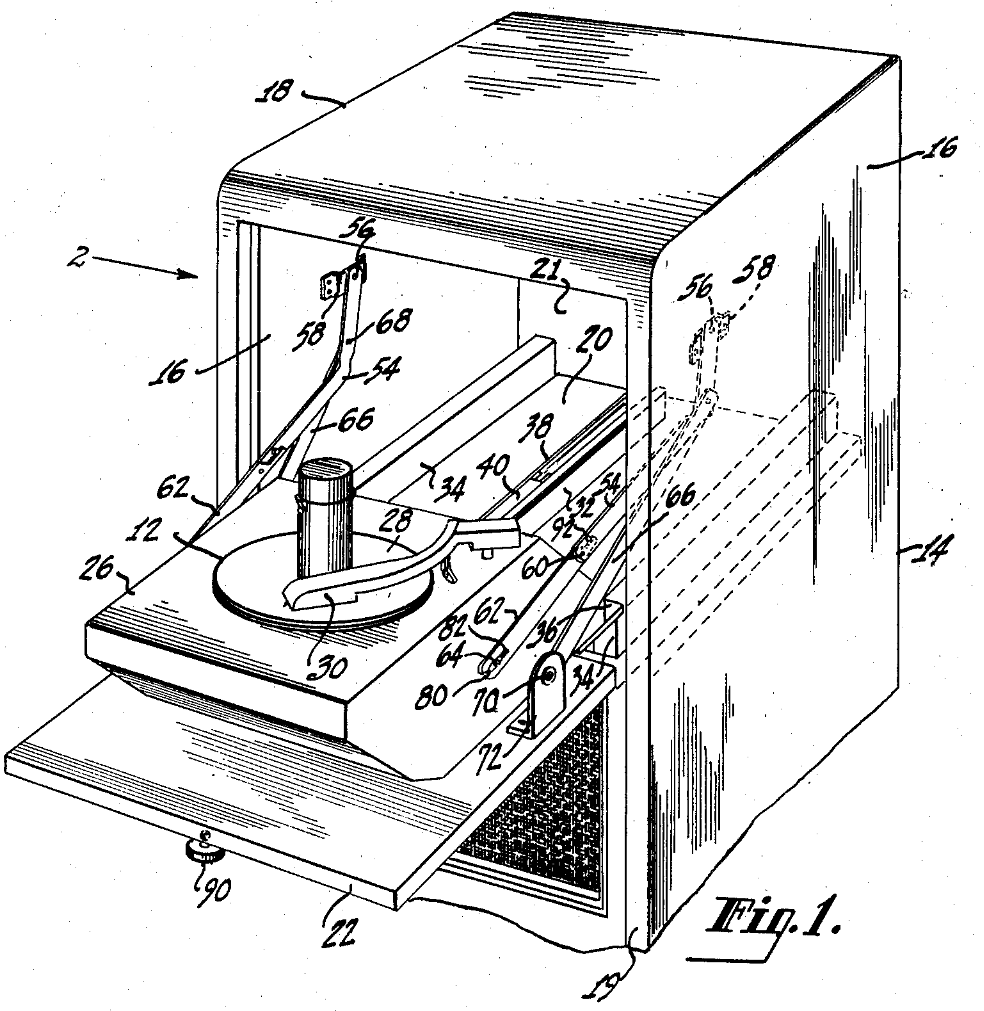
Figure 1 is a view in perspective of a carriage and linkage system for phonograph mechanisms and the like, embodying the invention and shown in its application to a console type cabinet and presenting a commercial form of record changer or player.
Figure 8:
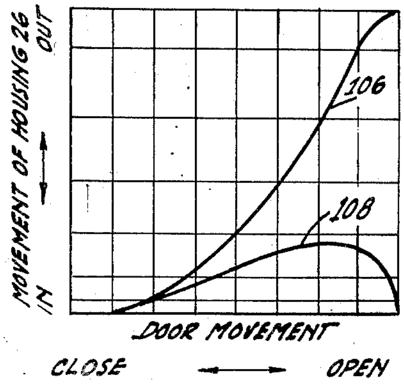
Figures 2, 4, 5:
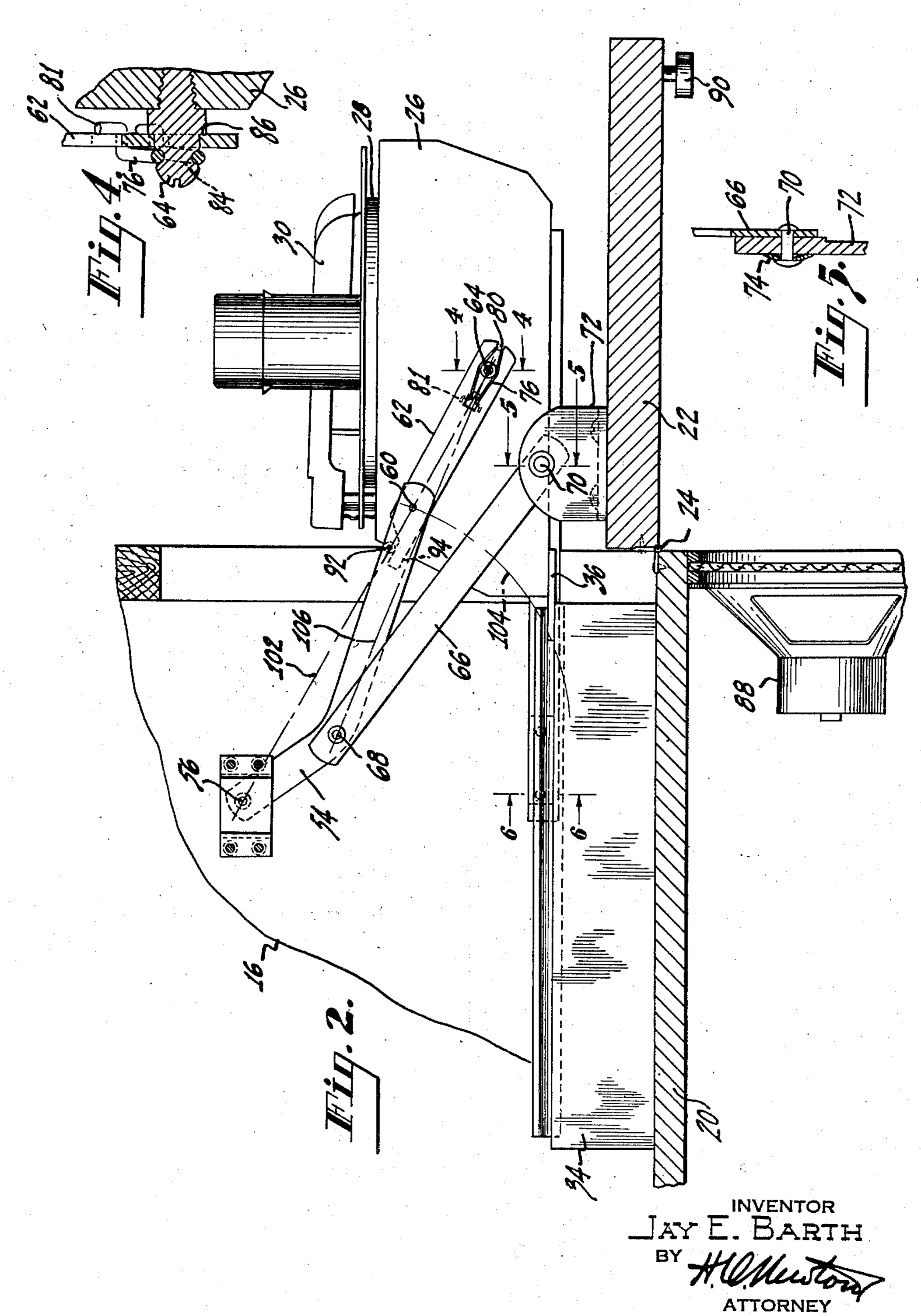
Figure 2 is a cross-sectional side view of the carriage and linkage system of Figure 1 taken in the direction of arrow 2, with the phonograph mechanism or record player shown fully withdrawn from the cabinet.
Figures 3, 6, 7:
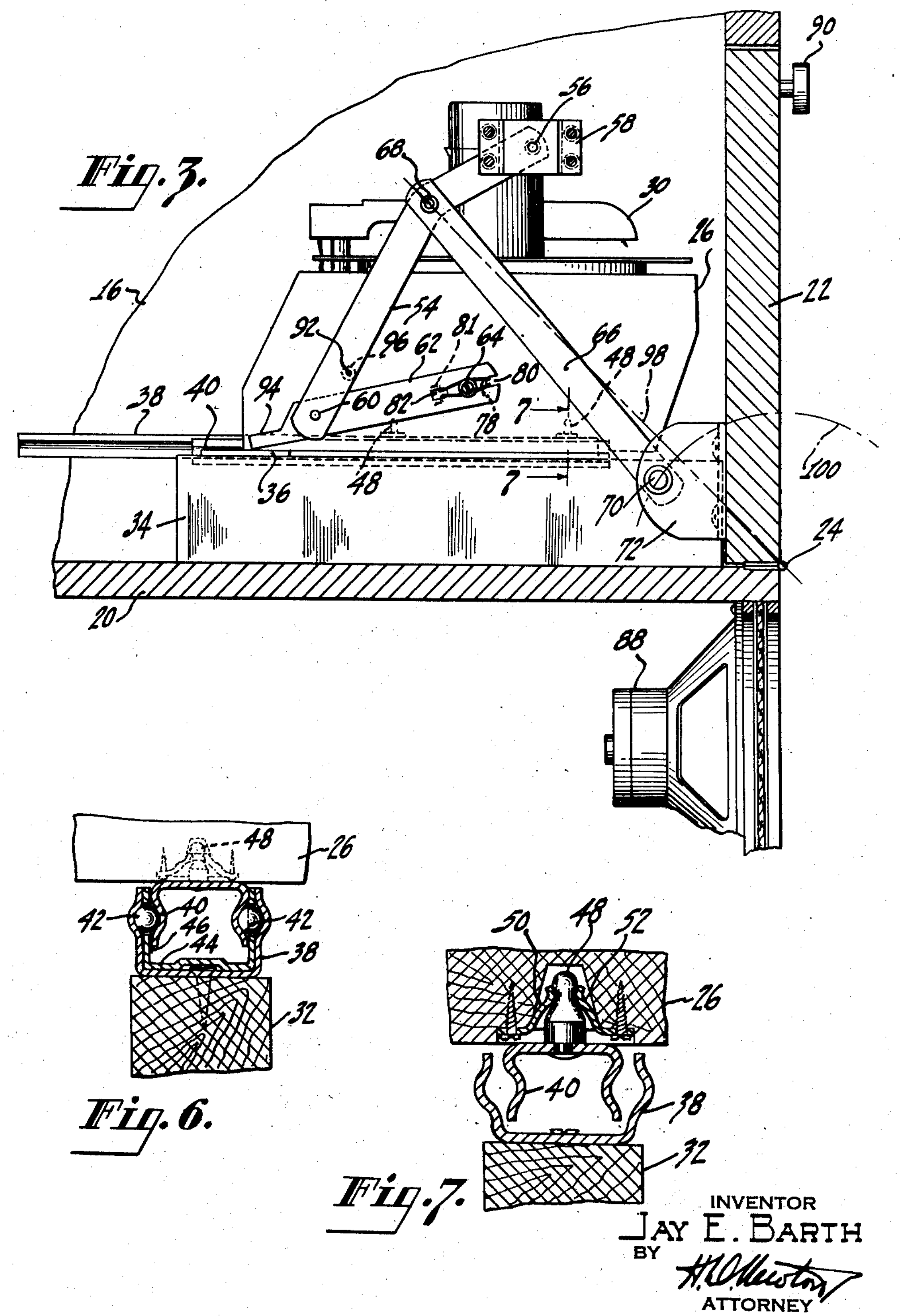
Figure 3 is a view similar to Figure 2 showing the record player in the fully retracted position.

Figures 4 and 5 are sectional detail views along lines 4—4 and 5—5 respectively of parts of the linkage system in the position shown in Figure 2;

Figures 6 and 7 are sectional detail views of the guide track mechanism forming part of the construction of Figures 1, 2 and 3, taken respectively along line 6—6 in Figure 2 and line 7—7 in Figure 3; and Figure 8 is a curve diagram illustrating some of the improved operational features of the present invention.

In accordance with the present invention, there is provided a door-actuated carriage system for automatically withdrawing and retracting a controlled mechanism such as a phonograph record player from a cabinet enclosure by a single manual operation. The carriage system includes a hinged door and a linkage by which movements of the door effect the withdrawal from and the retraction within the enclosure of the controlled mechanism. Certain parts of the linkage come to substantially dead-center position in order that the movement of the controlled mechanism may be gradually arrested as the door reaches one or both of its limiting positions. Additional guide structure is provided to guide the assembly into and out of the cabinet enclosure. The controlled mechanism may be readily detachable from the linkage and from the guide structure so that it can be conveniently removed as a unit for maintenance work or for operation at other locations.

Figures 1 to 5 of the drawings show a cabinet construction for housing a retractible controlled mechanism in the form of a record player 12. The cabinet 14 includes side walls 16, 16, a top 18 and a base portion 19. Within the cabinet there is provided a floor 20 which, with the walls and top define an enclosure 21 for receiving the record player 12. The forward edges of walls 16, 16, top 18, and floor 20 form a door frame at the bottom of which a door 22 is pivotally mounted by hinge 24. The rear of the space 21 may be closed by another wall (not shown) of the cabinet, or it may be left open, as desired.

The record player 12 includes a carriage unit or element 26 which carries a phonograph turntable 28, a tone arm 30, and the remainder of the phonograph operating mechanism (not shown). The carriage 26 is slidably mounted on a center rail 32 and two side rails 34 secured to the floor 20 of the compartment or enclosure 21.

Friction plates 36, which may merely be small strips of wood, are shown secured at the rear of and on both sides of the lower surface of carriage 26 for frictionally engaging and riding on the tops of side rails 34, 34. As more clearly shown in Figures 6 and 7, the center rail 32 supports on its upper surface an upwardly opening guide channel 38 in which is slidably mounted a downwardly opening channel 40 secured to the underside of the housing 26. The channels 38, 40 are shown as interlocked and may be prevented from rattling against each other by inserting between them sets of ball bearings 42, and by grooving the opposed channel walls to engage the balls. The balls 42 may be rotatably held by a retainer plate 44 fitted between the channels 38, 40.

To prevent rattling of the plate 44 against the channels, a bowed leaf spring 46 may be secured to the plate and wedged in place between a wall of the plate and a wall of one of the channels to firmly hold the plate against the other channel. The spring 46 may have its ends hooked into suitable perforations in plate 44. Stops (not shown) may be provided on the web of channel 38 to limit the travel of the channel 40 or of the plate 44 which moves with channel 40, but at a lower speed by reason of the rolling of balls 42.

The lower channel 38 is shown as held in place by screws securing its web to the top of rail 32. The upper channel 40 is detachably held to the housing 26 as shown more clearly in Figure 7. A plurality of friction studs 48 are riveted to the web of channel 40 and have peripherally grooved heads projecting above the channel. The head of each stud is received in a friction catch 50 shown in the form of a plate screwed to the housing and having inwardly and upwardly directed central spring arms 52 shaped to be snapped in place over the head of one of the studs 48 onto the peripheral groove thereof. The housing 26 is hollowed out at its lower face to receive the catches. Where the catch plates permit some slipping of the stud transversely of the arms, the plates for different studs may be mounted at right angles to each other so the separate slip paths are not aligned and the housing is relatively rigidly held.

The linkage system of the invention includes a set of three levers interconnecting the door 22 and the housing 26 at each side. Each set has an arm 54 pivoted at 56 to brackets 58 rigidly attached to cabinet walls 16, and connected at another pivot 60 on a link 62 which in turn is connected to a pivot post 64 projecting from the side of the housing 26. An operating bar 66 pivotally joins arm 54 at 68 to a pin 70 mounted on a bracket 72, which is fixed to the door 22.

To prevent looseness at the pivot points of the linkage, some or all of the pivots may have friction devices such as cup-shaped or trough-shaped spring washers 74 (Figure 5) pinched between some of the pivot members to resiliently take up any play. As more clearly shown in Figure 1, the arms 54 may have their lower shank portions offset somewhat from the adjacent bars 66 to provide clearance for protruding heads of pivot pin 60 as well as other elements such as post 64.

In order to make the phonograph player readily detachable from the linkage, link 62 is secured to post 64 by a spring holder 76, as more clearly shown in Figures 3 and 4. The spring holder is a spring wire bent into approximately the shape of a somewhat flattened rhombus or diamond having one vertex 78 looped over in the form of a hook to catch in a notch 80 at the end of link 62. The ends 81 of the bent wire form the diagonally opposite vertex of the rhombus and are also hooked to fit through and engage the edges of a slot 82 formed in the link 62. At its other vertices, spring holder 76 engages a circumferential groove 84 in post 64 by which it is resiliently expanded somewhat to securely hold the parts together. At the same time, by merely prying outwardly on the link 62, it will force the spring holder 76 out of the groove 84, thereby disengaging the link from the housing 26. Conversely, by pressing the spring holder carrying portion of unhooked link 62 against the stud, the spring holder will snap into place in the groove 84 and unite the parts. A shoulder 86 on post 64 keeps the link 62 from engaging and marring the side of housing 26 when snapped into place. Both the detachment and attachment of link 62 can be readily effected manually.

After the links 62 have been detached, the housing 26 can be readily separated from the slide guide by merely pulling the housing upwardly to cause the friction arms 52 to snap over the enlarged head of studs 48. When completely separated, the housing has no parts projecting below its smooth lower face so that it can be conveniently set down anywhere.

To complete the apparatus, the cabinet is also shown as equipped with a loudspeaker 88, and the door structure includes a handle or knob 90. A stop is provided for limiting the pivotal movement of link 62, thereby securely preventing the door 22 from being opened beyond the position shown in Figure 2. In the construction of the drawings, the stop is in the form of a pin 92 mounted on arm 54 in the path of movement of a rearward extension 94 of link 62. The pin 92 may be covered with a noise-reducing bumper such as a rubber cap 96.

A feature of the invention is the smooth movement imparted to the record player by operation of the door. As shown in Figure 3, when the door is closed, the operating bar 66 is somewhat beyond its dead center position between pivots 68 and 24. The dead center line is here shown at 98. It is noted that the pivot 70 for the operating bar is somewhat below the center line 98 with the door closed, but that upon opening the door, the pivot 70 moves upwardly to begin its arcuate travel around fixed hinge axis 24, the arc being indicated by the broken line 100.

When the door is fully open in the position shown in Figure 2, the link 62 and the arm 54 are approximately in dead center position. The center line between pivots 56 and 64 is shown at 102 and the arc of travel for pivot 60 is indicated by the broken line 104. The resistance offered to the rearward travel of post 64 also depends to a large extent upon the relation of pin 60 to pivots 64 and 68. Inasmuch as the direct application of retracting forces to the housing 26 tends to cause a load to be applied at 68, pivot pin 60 will strongly resist inward movement of the housing so long as it is at or above the line 106 connecting pivots 68 and 64. Approximate dead center position for pivot 60, that is for the linkage with the door open, can therefore be considered as anywhere from line 106 to line 102.

Not only does this approximate dead center movement greatly reduce the final rate of movement of the record player with respect to the door, thereby reducing any tendency for the record player to be jarred by rapid door movements, but it also makes it difficult to move the record player except by operation of the door. Thus, for example when manipulating the controls on the record player while it is in the withdrawn position of Figure 2, it is almost impossible to inadvertently push the player back into the enclosure 21 by any force exerted directly against the player. The linkage 54, 62 offers so much resistance to jackknifing under the influence of forces directed through pivot 64 as to make it practically essential to operate the door 22 to return the record player to the enclosure 21.

By making the operating linkage move slightly beyond dead center, as shown in the retracted position of Figure 3, the record player is actually locked in place and it becomes impossible for it to force its way out of the enclosure 21 as a result of its being jarred, for example. When the cabinet is transported from one location to another, it is unnecessary to secure any of the movable members including the door 22. The mere closure of the door will lock everything in place even against violent shocks, jars and bumps. By increasing the friction at the pivots as pointed out above, or by the provision of a door holder such as the simple ball-type catch, any likelihood that the door itself may be opened by jarring forces is also considerably reduced. Without such a safeguard, the door might be momentarily thrown open sufficiently to move pivot 70 back from beyond the dead center line 98 and the record player would then be in a position to move outwardly under the influence of its own weight.

It will be seen that the arm 54 operates effectively as a lever of the third class, and the door effectively as a lever of the second class, in controlling the carriage movement.

Figure 8 shows the relationship between the control movements of the door and the movements of the housing 26. Curve 106 represents the relative travel positions, whereas curve 108 indicates the relative acceleration of the housing 26 at different portions of its travel with the door moving at constant speed.

It is noted that adjacent to the closed or retracted position, the rate of movement and the degree of acceleration of the housing is extremely small so that even violent door closing operations will not jar the record player. The housing will still be smoothly retarded in velocity from maximum speed to rest as indicated by curve 108.

Another feature of the invention is the fact that all of the linkage elements can be made of strip metal readily available at low cost. The bends in arm 54 can be made by conventional techniques directly on the commercially available strips.

The linkage system of the invention can be used with controlled mechanisms other than record players. By way of example the housing 26 may contain the chassis of a radio receiver with controls projecting out from its front and/or upper face, for manipulation after the door is opened and for return to hidden position when the door is closed to shield it from inadvertent or unauthorized operation. Alternatively, the housing 26 may include only a control panel of a radio receiver or a record player together with a set of radio receiver control knobs.

Although the linkage of the invention has been shown mounted on both sides of a control assembly, it need only be supplied on one side, or at the top and/or bottom with vertically directed pivots.

The particular features of the guide structure including rails 32, 34 and the cooperating elements can be varied considerably in accordance with the principles of the invention. Thus they may merely be in the form of simple interfitting slide members suitably mounted on any desired manner on the cabinet and housing 26. To prevent undesired tilt of the housing around the slide guide members, they are preferably arranged to restrain movements of the housing at right angles to the pivots 64, i. e. vertical movements in the construction described in the figures. Instead of having three slide guides, more or fewer can be satisfactorily used. For ease of detachability the number of guides that restrain the lifting out of the housing should be a minimum.

While several exemplifications of the invention have been indicated and described above, it will be apparent to those skilled in the art that other modifications may be made without departing from the scope of the invention as set forth in the appended claims.

What is claimed is:

1. In a cabinet door actuated carriage system for phonograph record players and the like, a cabinet having side walls, a base member, and a door mounted for movement about a fixed hinge axis on said base member thereby forming a closure means for said cabinet, a guided carriage slidably mounted on said base member within said cabinet, and a linkage system interconnecting said side walls, said door and said carriage whereby movement of said door between limits of a vertically closed and an open outwardly extending position effect withdrawal from and retraction within said cabinet of said guided carriage, and said linkage system effectively passes through dead-center positions for locking said carriage for each of said positions and for gradually accelerating said carriage as said door moves from rest in closing and opening, and for gradually decelerating said carriage as said door reaches said limiting positions, said linkage system including an elongated arm having a first end portion pivotally mounted on one of said side walls within said cabinet at a fixed pivotal axis spaced with respect to said hinge axis of said door, and a second end portion, a link element having two pivot points at one of which it is connected to said second end portion of said arm and the other of said last named pivot points being detachably connected with said slidable carriage, and an operating bar pivotally connected at one end with said door in spaced relation to said hinge axis, and at the opposite end to an intermediate point on said arm for transmitting said withdrawing and retracting movement from said door through said arm and said link to said carriage and locking elements on said arm and said link whereby retraction of said guided carriage from said locked dead center position can be accomplished only by the door movement.

2. In a phonograph apparatus, a cabinet having a phonograph record player receiving space and an opening therefor through which a record player may be moved for loading and unloading, guide structure for a movable record player secured to the cabinet within said space, a phonograph record player unit mounted on said guide structure for guided movement thereon, a pivoted door structure having a horizontal hinge axis adjacent a lower edge of said cabinet opening, an angular lever pivoted at one end of a short end portion within said cabinet space on a fixed horizontal pivot axis and depending from said pivot axis, a flat link member pivotally connected at one end to a depending long end portion of said lever and having a detachable pivoted connection at the opposite end connected to said record player unit, and an operating bar pivoted to said door structure and to said arm at a point intermediate between the ends of said arm for withdrawing the said phonograph record player unit through said cabinet opening when said door is opened and retracting said unit into said cabinet space when said door is closed, said operating bar being connected to move through dead center with respect to said hinge axis when said door structure reaches its fully closed position and said link being connected to move through dead center with respect to said long end portion of said angular lever when said door reaches its fully opened position for reducing the relative speed of movement of said record player unit with respect to said door structure movement toward the opened and closed limits of its travel and thereby effectively preventing undesired jarring of said record player unit when the door structure is moved.

3. In a phonograph apparatus, a cabinet having a phonograph record player receiving space and an opening therefor through which a record player may be moved for loading and unloading, guide structure for a movable record player secured to the cabinet within said space, a phonograph record player mounted on said guide structure for guided movement thereon, a pivoted door structure having a horizontal hinge axis adjacent a lower edge of said cabinet opening, a lever arm pivoted at one end within said cabinet space on a fixed horizontal pivot axis and depending from said pivot axis, a flat link member pivotally connected at one end to a depending end portion of said arm and having a detachable pivoted connection at the opposite end connected to said record player, and an operating bar pivoted to said door structure and to said arm at a point intermediate between the ends of said arm for withdrawing the said phonograph record player through said cabinet opening when said door is opened and retracting said record player into said cabinet space when said door is closed, said operating bar being connected to move through dead center with respect to said hinge axis when said door structure reaches its fully closed position and said link being connected to move through dead center position comprising a line between the pivot connection of the operating bar and lever and the pivot connection between the link and the guide structure when said door reaches its fully opened position for reducing the relative speed of movement of said record player with respect to said door structure movement toward the opened and closed limits of its travel and thereby effectively preventing undesired jarring of said record player when the door structure is moved.

4. In a phonograph apparatus, a cabinet having a phonograph record player receiving space and an opening therefor through which a record player may be moved for loading and unloading, guide structure for a movable record player secured to the cabinet within said space, a phonograph carriage means mounted on said guide structure for guided movement thereon, a pivoted door structure having a horizontal hinge axis adjacent a lower edge of said cabinet opening, a lever arm pivoted at one end within said cabinet space on a fixed horizontal pivot axis and depending from said pivot axis, a flat link member pivotally connected at one end to a depending end portion of said arm and having a detachable pivoted connection at the opposite end connected to said carriage means, and an operating bar pivoted to said door structure and to said arm at a point intermediate between the ends of said arm for withdrawing the said phonograph carriage means through said cabinet opening when said door is opened and retracting said carriage means into said cabinet space when said door is closed, said operating bar being connected to move through dead center with respect to said hinge axis when said door structure reaches its fully closed position and said link having an approximate dead center movement with respect to the pivot connections of said lever arm when said door reaches its fully opened position for reducing the relative speed of movement of said carriage means with respect to said door structure movement toward the opened and closed limits of its travel and thereby effectively preventing undesired jarring of said carriage means when the door structure is moved.

5. A movable carriage system for phonograph mechanisms and the like, comprising in combination, a phonograph cabinet structure having a compartment and closure means for one substantially vertical side thereof including a door member having a fixed horizontal hinge axis along a lower edge thereof, horizontally movable carriage means for a phonograph mechanism in said compartment, a three element flat-bar linkage located adjacent a lateral side of the compartment and interconnecting the door member and carriage means, said linkage comprising an elongated flat lever arm having one end portion pivotally connected with said cabinet structure within said compartment at a fixed location on said lateral side spaced with respect to and above said hinge axis of said door member, a flat link element pivotally connected at one end with an opposite end portion of said arm, said link element having a second pivotal connection at the opposite end with said movable carriage means, and a flat operating bar connected between an intermediate point on said lever arm and a point on said door member in spaced relation to said hinge axis for transmitting withdrawing and retracting movements from said door member to said carriage means, said connection for said operating bar with said door being spaced therefrom inwardly of said compartment to bring said connection of said operating bar through a dead center position with respect to a line through said hinge axis and the pivotal connection of said bar with said lever when said door member is in the closed position and said connection for said link with said lever arm being spaced to bring said link to dead center position with respect to a line through an axis of said link and said connection of the lever arm and cabinet.

6. A movable carriage system for phonograph mechanisms and the like, as defined in claim 5, wherein said pivot connection of said lever arm with said cabinet structure is in such spaced relation to said operating bar connections and said link element connections that said carriage means is selectively slowly accelerated from rest and decelerated to rest in response to movement of said door member between the limits of its travel.

JAY E. BARTH.

REFERENCES CITED

The following references are of record in the file of this patent:

UNITED STATES PATENTS

| Number | Name | Date |
|---|---|---|
| 1,062,263 | Sundquist | May 20, 1913 |
| 1,379,091 | Farquhar | May 24, 1921 |
| 2,300,287 | Huarisa | Oct. 27, 1942 |
| 2,319,651 | Wilkinson | May 18, 1943 |
| 2,473,467 | Burt | June 14, 1949 |